(12) United States Patent
Jamal-Syed et al.

(10) Patent No.: US 10,291,672 B2
(45) Date of Patent: May 14, 2019

(54) TRANSFERRING PLAYBACK OF MEDIA CONTENT BETWEEN MOBILE DEVICE AND VEHICLE

(71) Applicant: Telefonaktiebolaget LM Ericsson (publ), Stockholm (SE)

(72) Inventors: Shaheer Jamal-Syed, Shanghai (CN); Andreas Ljunggren, Vällingby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/574,670

(22) PCT Filed: May 20, 2015

(86) PCT No.: PCT/CN2015/079357
§ 371 (c)(1),
(2) Date: Nov. 16, 2017

(87) PCT Pub. No.: WO2016/183817
PCT Pub. Date: Nov. 24, 2016

(65) Prior Publication Data
US 2018/0131737 A1 May 10, 2018

(51) Int. Cl.
*H04L 29/06* (2006.01)
*G11B 27/10* (2006.01)
(Continued)

(52) U.S. Cl.
CPC .......... *H04L 65/4084* (2013.01); *G06F 3/165* (2013.01); *G11B 27/00* (2013.01);
(Continued)

(58) Field of Classification Search
CPC ........................................................ H04B 5/00
(Continued)

(56) References Cited

U.S. PATENT DOCUMENTS 8,880,648 B1  11/2014  Arora et al.
2009/0005070 A1  1/2009  Forstall et al.
(Continued)

FOREIGN PATENT DOCUMENTS

CN  102857805 A  1/2013
CN  103594100 A * 2/2014
(Continued)

OTHER PUBLICATIONS

International Search Report for PCT International Application No. PCT/CN2015/079357, 3 pages (dated Feb. 29, 2016).
(Continued)

*Primary Examiner* — Melur Ramakrishnaiah
(74) *Attorney, Agent, or Firm* — Sage Patent Group (57) ABSTRACT

The disclosure provides a method in a vehicle and an apparatus for a vehicle for transferring playback of media content between a mobile device and the vehicle. The method comprises detecting the playback of the media content on the mobile device and retrieving the media content played back on the mobile device. Then, the retrieved media content is played back at the vehicle in synchronization with the playback of the media content on the mobile device. Next, a first message is sent to the mobile device instructing the mobile device to pause its playback of the media content. The disclosure provides a method and a mobile device for transferring playback of media content between the mobile device and a vehicle.

15 Claims, 9 Drawing Sheets

(51) Int. Cl.
*G11B 27/00* (2006.01)
*H04L 29/08* (2006.01)
*H04W 4/80* (2018.01)
*G06F 3/16* (2006.01)
*H04W 4/48* (2018.01)

(52) U.S. Cl.
CPC ............ *G11B 27/005* (2013.01); *G11B 27/10* (2013.01); *H04L 65/1096* (2013.01); *H04L 65/4092* (2013.01); *H04L 67/104* (2013.01); *H04L 67/148* (2013.01); *H04W 4/80* (2018.02); *H04W 4/48* (2018.02)

(58) Field of Classification Search
USPC .......... 700/94; 709/218, 220, 221, 229, 217; 455/41.2
See application file for complete search history.

(56) References Cited

U.S. PATENT DOCUMENTS

| | | | |
|---|---|---|---|
| 2009/0271525 | A1 | 10/2009 | Jung et al. |
| 2011/0295974 | A1* | 12/2011 | Kashef ............... H04L 65/1073 709/217 |
| 2013/0005258 | A1* | 1/2013 | Uefuji ............... H04M 1/72527 455/41.2 |
| 2014/0122589 | A1 | 5/2014 | Fyke et al. |
| 2014/0258469 | A1 | 9/2014 | Maharajh et al. |
| 2014/0279889 | A1 | 9/2014 | Luna |
| 2015/0094834 | A1 | 4/2015 | Vega et al. |
| 2016/0210110 | A1* | 7/2016 | Feldman ............... G06F 3/165 |

FOREIGN PATENT DOCUMENTS

| | | |
|---|---|---|
| CN | 103594100 A | 2/2014 |
| WO | WO 2012/116443 A1 | 9/2012 |
| WO | WO 2014/118793 A1 | 8/2014 |
| WO | WO 2015/006933 A1 | 1/2015 |

OTHER PUBLICATIONS

Written Opinion of the International Searching Authority for PCT International Application No. PCT/CN2015/079357, 4 pages (dated Feb. 29, 2016).

Wi-Fi Alliance, "Wi-Fi Alliance® Technical Committee Wi-Fi Display Technical Task Group—Wi-Fi Display Technical Specification, Version 1.0.0," Jan. 1, 2012 (Jan. 10, 2012), XP055320680, 149 pages.

Wi-Fi Alliance, "Wi-Fi CERTIFIED Miracast™: Extending the Wi-Fi experience to seamless video display," Sep. 19, 2012 (Sep. 19, 2012), XP002700078, 18 pages.

European Search Report for European Patent Application No. 15892196.5 dated Mar. 19, 2018.

Communication Under Article 94(3) for European Patent Application No. 15,892,196.5-1213, dated Jan. 28, 2019, 11 Pages.

* cited by examiner

Fig. 13

TRANSFERRING PLAYBACK OF MEDIA CONTENT BETWEEN MOBILE DEVICE AND VEHICLE

CROSS REFERENCE TO RELATED APPLICATION

This application is a 35 U.S.C. § 371 national stage application of PCT International Application No. PCT/CN2015/079357 filed on May 20, 2015, the disclosure and content of which is incorporated herein by reference in its entirety.

TECHNICAL FIELD

The present disclosure generally relates to the technical field of wireless communications, and particularly, to an apparatus for a vehicle and related method for transferring playback of media content between a mobile device and the vehicle, and a mobile device and related method for transferring playback of media content between the mobile device and a vehicle.

BACKGROUND

This section is intended to provide a background to the various embodiments of the technology described in this disclosure. The description in this section may include concepts that could be pursued, but are not necessarily ones that have been previously conceived or pursued. Therefore, unless otherwise indicated herein, what is described in this section is not prior art to the description and/or claims of this disclosure and is not admitted to be prior art by the mere inclusion in this section.

The term "Internet of Things" has come to describe a number of technologies and research disciplines that enable the Internet to reach out into the real world of physical objects. Technologies like cloud computing and providing of services within such environments, radio frequency identification (RFID), short-range wireless communications, real-time localization and sensor networks are now becoming increasingly common, bringing the Internet of Things into commercial use.

It is predicted that in the long term future, there will be billions of Machine to Machine (M2M) devices, and the number of M2M devices will far exceed the number of devices used for communication between humans (such as mobile telephones, personal computers and so on).

These technologies foreshadow an exciting future that closely interlinks the physical world and cyberspace or the Internet—a development that is not only relevant to researchers, but to corporations and individuals alike. The vast number of connected devices has the capacity to create additional services for users by connecting devices to enable M2M communication in areas such as entertainment, government, health, transportation, utilities, manufacturing, financial services and retail.

In the prior art, as a user who is listening to a song using his phone enters his car, he may continue listening to the song using his phone, connect his phone to the speaker system of the car via cables or connectors, or even stop the playback of the song at his phone and instead turn on the stereo system of the car to play back the same song. In the first two cases, the user may experience an undesirable loss of the limited mobile phone battery power even on his car which can provide a continuous supply of power by consuming fossil fuel. In the third case, the user may experience an unpleasant interruption of his listening to the song.

SUMMARY

An object of the present disclosure is to overcome the above-described disadvantages in the prior art.

According to a first aspect of the present disclosure, there is provided a method in a vehicle for transferring playback of media content between a mobile device and the vehicle. The method comprises detecting the playback of the media content on the mobile device and retrieving the media content played back on the mobile device. Then, the retrieved media content is played back at the vehicle in synchronization with the playback of the media content on the mobile device. Next, a first message is sent to the mobile device instructing the mobile device to pause its playback of the media content.

According to a second aspect of the present disclosure, there is provided an apparatus for a vehicle for transferring playback of media content between a mobile device and the vehicle. The apparatus comprises a detecting section, a retrieving section, a playing-back section and a communicating section. The detecting section is configured to detect the playback of the media content on the mobile device. The retrieving section is configured to retrieve the media content played back on the mobile device. The playing-back section is configured to play back the retrieved media content at the vehicle in synchronization with the playback of the media content on the mobile device. The communicating section is configured to send to the mobile device a first message instructing the mobile device to pause its playback of the media content.

According to a third aspect of the present disclosure, there is provided a method in a mobile device for transferring playback of media content between the mobile device and a vehicle. The method comprises receiving from the vehicle a first message instructing the mobile device to pause its playback of the media content. The method further comprises pausing the playback of the media content on the mobile device.

According to a fourth aspect of the present disclosure, there is provided a mobile device for transferring playback of media content between the mobile device and a vehicle. The mobile device comprises a communicating section and a playback controlling section. The communicating section is configured to receive from the vehicle a first message instructing the mobile device to pause its playback of the media content. The playback controlling section is configured to pause the playback of the media content on the mobile device.

According to a fifth aspect of the present disclosure, there is provided a computer program comprising computer readable code units which when run on an apparatus according to the second aspect causes the apparatus to perform the method according to the first aspect.

According to a sixth aspect of the present disclosure, there is provided a computer program comprising computer readable code units which when run on a mobile device according to the fourth aspect causes the apparatus to perform the method according to the third aspect.

According to seventh aspect, there is provided a computer program product comprising computer readable medium and a computer program according to the fifth or the sixth aspect stored on the computer readable medium.

With the proposed solutions according to the first to the seventh aspects, the playback of the media content can be automatically and seamlessly taken over by his car, as soon as a user who enjoys the media content (for example, listening to a song) using his mobile device enters the car. Accordingly, uninterrupted playback of the media content can be achieved and meanwhile the limited battery power of the mobile device can be saved.

BRIEF DESCRIPTION OF THE DRAWINGS

The above and other objects, features, and advantages of the present disclosure will become apparent from the following descriptions on embodiments of the present disclosure with reference to the drawings, in which.

DETAILED DESCRIPTION OF EMBODIMENTS

In the discussion that follows, specific details of particular embodiments of the present disclosure are set forth for purposes of explanation and not limitation. It will be appreciated by those skilled in the art that other embodiments may be employed apart from these specific details. Furthermore, in some instances detailed descriptions of well-known methods, nodes, interfaces, circuits, and devices are omitted so as not obscure the description with unnecessary detail.

Those skilled in the art will appreciate that the functions described may be implemented in one or in several nodes. Some or all of the functions described may be implemented using hardware circuitry, such as analog and/or discrete logic gates interconnected to perform a specialized function, ASICs, PLAs, etc. Likewise, some or all of the functions may be implemented using software programs and data in conjunction with one or more digital microprocessors or general purpose computers. Where nodes that communicate using the air interface are described, it will be appreciated that those nodes also have suitable radio communications circuitry. Moreover, the technology can additionally be considered to be embodied entirely within any form of computer-readable memory, including non-transitory embodiments such as solid-state memory, magnetic disk, or optical disk containing an appropriate set of computer instructions that would cause a processor to carry out the techniques described herein.

Hardware implementations of the presently disclosed techniques may include or encompass, without limitation, digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors or one or more controllers, and the terms computer, processor, and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

As those skilled in the art will appreciate, the term "media content" as used herein refers to any data or signal that is able to convey information and ideas in various forms. Examples of such media content include, but are not limited to, audio data or content, image data or content, video data or content, audiovisual data or content and multimedia content. The term "mobile device" as used herein refers to any portable device which is able to play back media content to an end user.

Examples of such mobile devices include, but are not limited to, mobile phones, smartphones, media players, laptops, tablets, netbooks and personal digital assistants.

Figure 1:
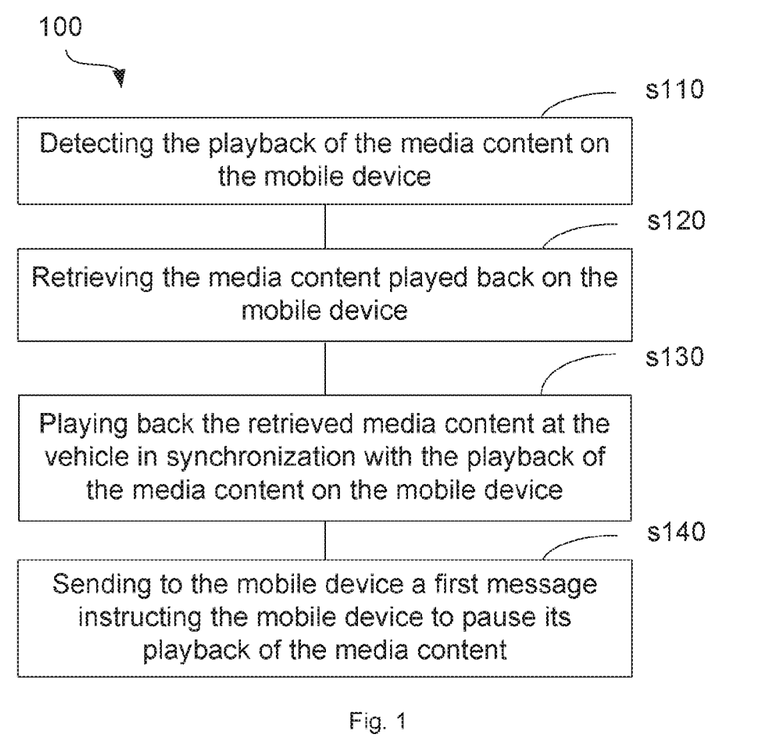
FIGS. 1-5 are flowcharts illustrating operations of a method in a vehicle for transferring playback of media content between a mobile device and the vehicle according to the present disclosure.

FIG. 1 schematically illustrates a method 100 in a vehicle for transferring playback of media content between a mobile device and the vehicle according to the present disclosure.

As illustrated, initially, the playback of the media content on the mobile device is detected at step s110. The media content played back by the mobile device may be or include audio content, and the vehicle may be provided with a microphone that is arranged to detect if the audio content has a level higher than the ambient noise level. If so, it is detected that the media content is being played back on the mobile device.

Figure 2:
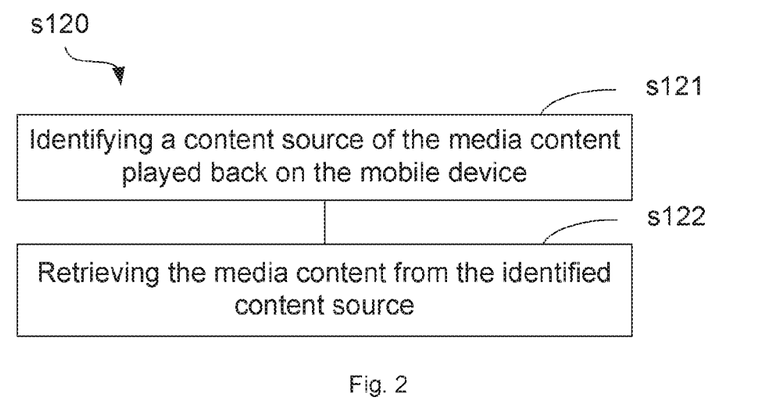

Then, at step s120, the media content played back on the mobile device is retrieved. In an embodiment, step s120 may comprise step s121 and s122 as illustrated in FIG. 2. At step s121, a content source of the media content played back on the mobile device is identified. At step s122, the media content is retrieved from the identified content source.

In an embodiment, step s121 may be implemented by using a digital watermark embedded in the media content captured by the microphone of the vehicle. Specifically, according to the watermark embedded in the captured media content, it is possible for the vehicle to identify the media content that is being played back by the mobile device and also to identify the source of the media content (for example, a cloud service such as Spotify, Podcast or the like).

Additionally or alternatively, the vehicle may identify the source of the media content played back on the mobile device, through information sharing between the mobile device and the vehicle which is enabled by a pairing process therebetween.

Figure 3:
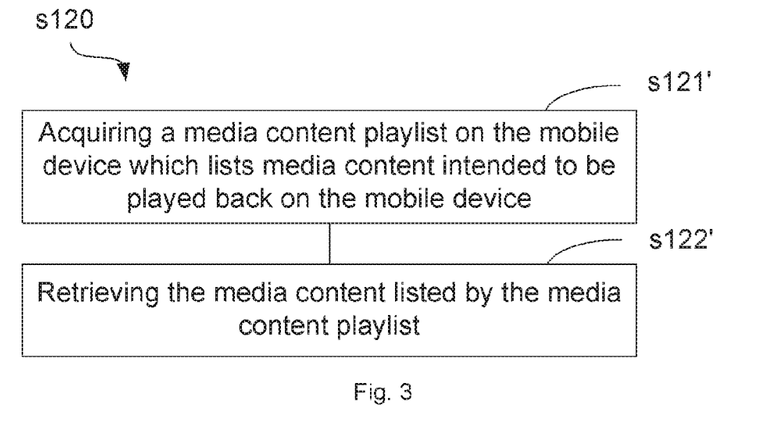

In another embodiment, step 120 may comprise step s121' and s122' as illustrated in FIG. 3. At step s121', a media content playlist on the mobile device which lists media content intended to be played back on the mobile device is acquired. At step s122', the media content listed by the media content playlist is retrieved.

In an embodiment, step s121' may be implemented by identifying the content source of the media content played back on the mobile device and then acquiring the media content playlist from the content source. Then, at step s122', the media content listed by the media content playlist is retrieved from the identified content source. Alternatively, in case the media content playlist and the listed media content are stored in the user's cloud drive, it is possible to acquire the media content playlist and retrieve the listed media content from the cloud drive. In case a pairing process has been performed between the mobile device and the vehicle, the vehicle can directly acquire the media content playlist as shared information between the mobile device and the vehicle.

Referring back to FIG. 1, at step s130, the retrieved media content is played back at the vehicle in synchronization with the playback of the media content on the mobile device. The synchronous playback of the media content at the vehicle and the mobile device may be achieved by counting the frames of the media content captured by the microphone of the vehicle and offsetting the start of the playback of the retrieved media content on the vehicle based on the frame count. Additionally or alternatively, the synchronization may be achieved by including into the watermark embedded in a media frame a timestamp that indicates the frame number of the media frame and starting playback of the retrieved media content based on the indicated frame number of the most recently captured media frame.

After step s130, a first message instructing the mobile device to pause its playback of the media content is sent to the mobile device at step s140.

As such, the playback of the media content can be automatically and seamlessly taken over by his car, as soon as the user who enjoys the media content using his mobile device enters the car. Accordingly, uninterrupted playback of the media content can be achieved and meanwhile the limited battery power of the mobile device can be saved.

Figure 4:
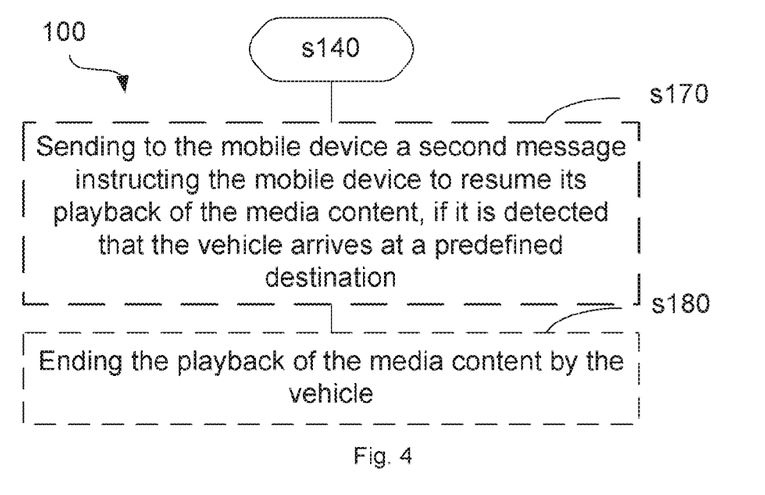

As illustrated in FIG. 4, if it is detected that the vehicle arrives at a predefined destination at step s140, the method 100 may proceed to step s170, at which a second message instructing the mobile device to resume its playback of the media content is sent to the mobile device. By way of example, the vehicle can detect the arrival at the predefined destination by means of Global Positioning System (GPS), Cloud services (such as Info Traffic Systems (ITS), Connected Vehicle Cloud (CVC), etc.) and/or the like. Then, at step s180, the playback of the media content by the vehicle is ended.

As such, the playback of the media content can be automatically and seamlessly transferred back to the user's mobile device from his car, when he arrives at the predefined destination. Accordingly, the user can get out of the car while enjoying the media content uninterruptedly.

Figure 5:
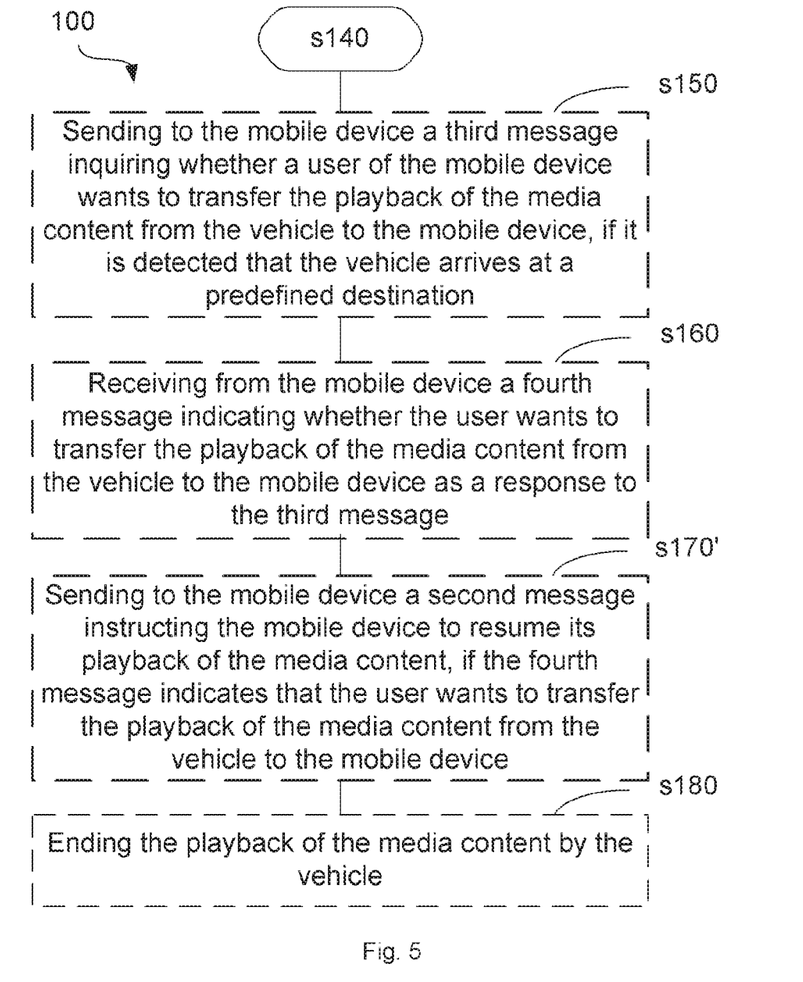

Alternatively, if it is detected that the vehicle arrives at a predefined destination at step s140, a third message inquiring whether a user of the mobile device wants to transfer the playback of the media content from the vehicle to the mobile device may be sent to the mobile device at step s150, as illustrated in FIG. 5. Then, at step s160, a fourth message indicating whether the user wants to transfer the playback of the media content from the vehicle to the mobile device as a response to the third message may be received from the mobile device. In case the fourth message indicates that the user wants to transfer the playback of the media content from the vehicle to the mobile device, a second message instructing the mobile device to resume its playback of the media content may be sent to the mobile device at step s170'. Thereafter, the playback of the media content by the vehicle may be ended at step s180.

Figure 7:
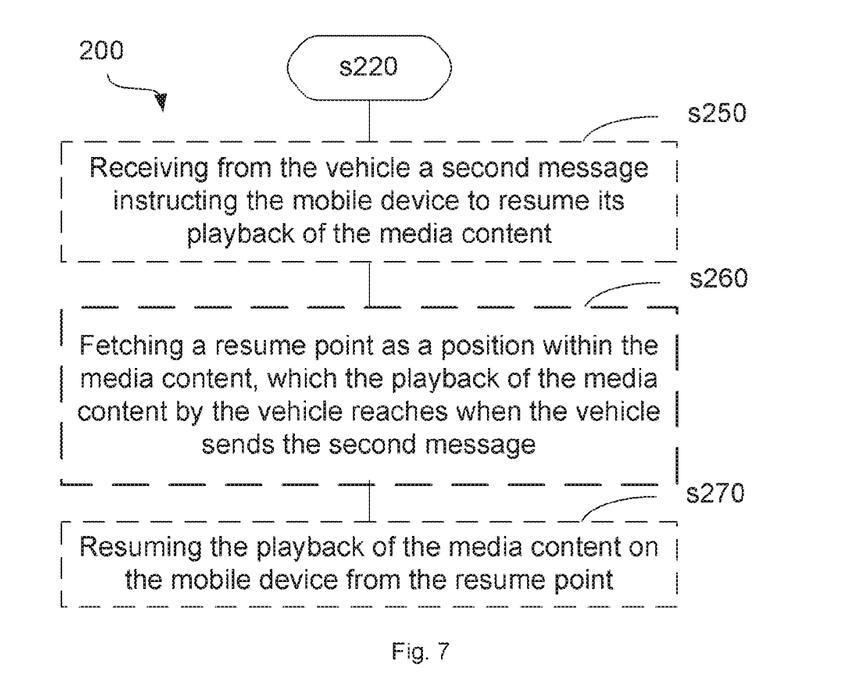
Figure 8:
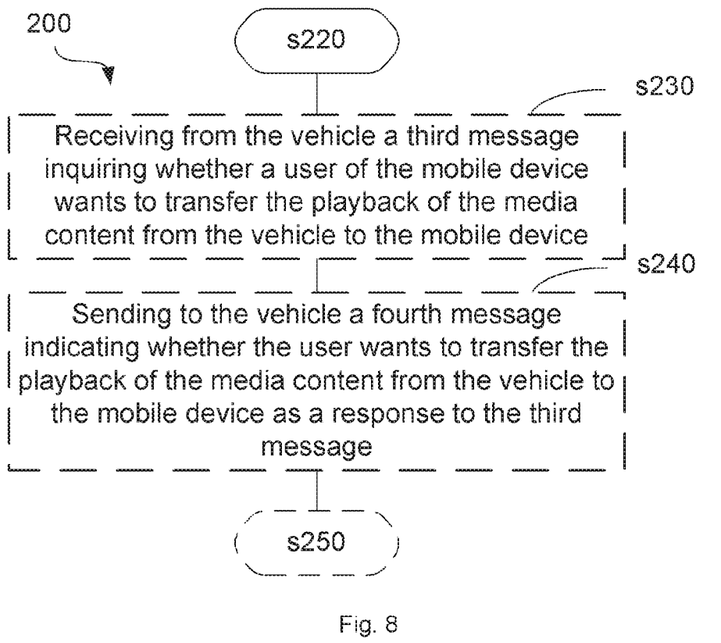

Correspondingly to the method 100 for transferring playback of media content between a mobile device and a vehicle described above with reference to FIGS. 1-5 from the perspective of the vehicle, a method 200 for transferring playback of the media content between the mobile device and the vehicle will be described in the following with reference to FIGS. 6-8 from the perspective of the mobile device.

Figure 6:
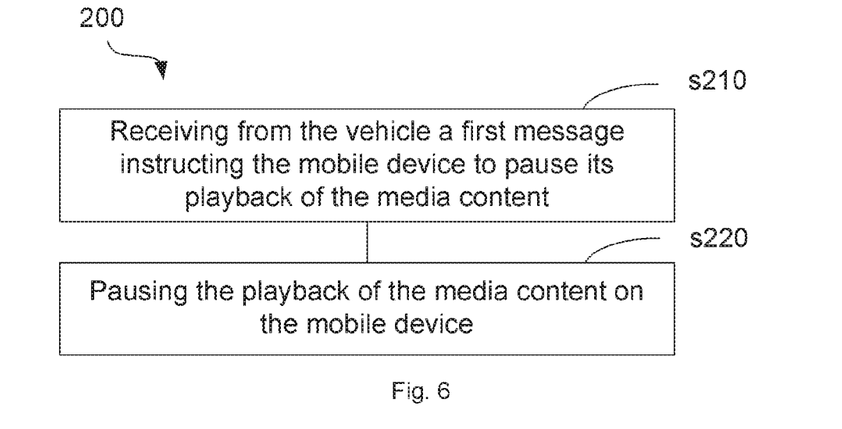
FIGS. 6-8 are flowcharts illustrating operations of a method in a mobile device for transferring playback of media content between the mobile device and a vehicle according to the present disclosure.

Referring to FIG. 6, the method 200 begins with step s210, at which a first message instructing the mobile device to pause its playback of the media content is received from the vehicle. Then, at step s220, the playback of the media content on the mobile device is paused.

In an embodiment, after step s220, the method 200 may proceed to step s250, at which a second message instructing the mobile device to resume its playback of the media content is received from the vehicle. Then, at step s260, a resume point is fetched as a position within the media content, which the playback of the media content by the vehicle reaches when the vehicle sends the second message. In practical implementation, the resume point may be included in the second message sent by the vehicle or it can be derived from a frame count or a timestamp, which can be used to achieve synchronous playback of the media content at the mobile device and the vehicle as described above. Alternatively, the resume point may be fetched from the source of the media content (for example, a cloud service such as Spotify, Podcast or the like). Next, the playback of the media content on the mobile device is resumed from the resume point at step s270.

Optionally, after step s220 and before step s250, the method 200 may proceed to step s230, at which a third message inquiring whether a user of the mobile device wants to transfer the playback of the media content from the vehicle to the mobile device is received from the vehicle. Then, at step s240, a fourth message indicating whether the user wants to transfer the playback of the media content from the vehicle to the mobile device as a response to the third message is sent to the vehicle. The second message is received from the mobile device if the fourth message indicates that the user wants to transfer the playback of the media content from the vehicle to the mobile device.

Figure 9:
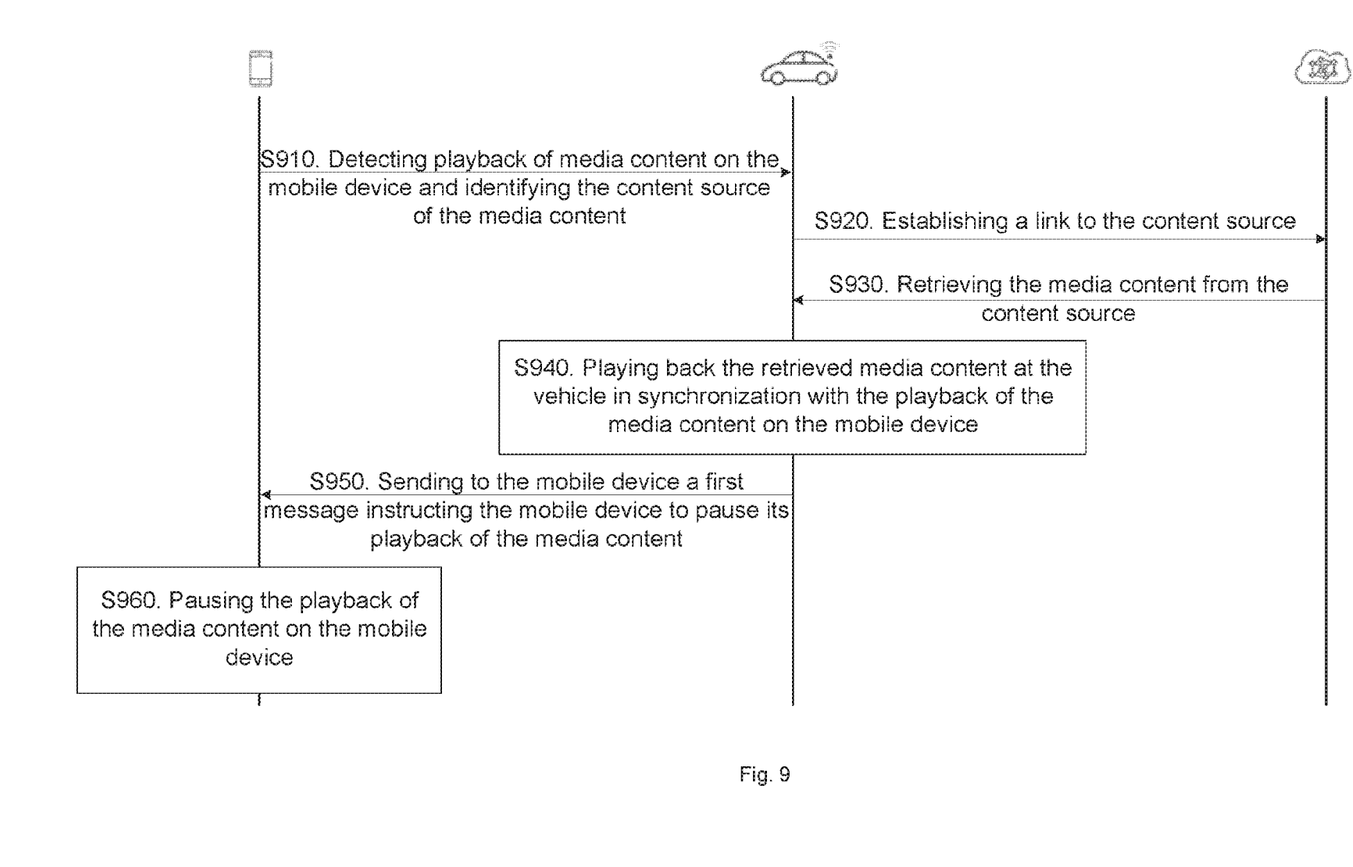
FIG. 9 is a signaling diagram illustrating exemplary operations of and interactions among a mobile device, a vehicle and a cloud service for transferring playback of media content from the mobile device to the vehicle according to an embodiment of the present disclosure.

To facilitate a better understanding of the proposed solutions, FIG. 9 depicts exemplary operations of and interactions among a mobile device, a vehicle and a cloud service for transferring playback of media content from the mobile device to the vehicle according to an embodiment of the present disclosure.

As illustrated, at step s910, the vehicle detects the playback of media content on the mobile device and identifies the content source of the media content as the cloud service such as Spotify, Podcast or the like. Then, the vehicle establishes a link to the content source at step s920 and retrieves the media content from the content source at step s930. Next, the vehicle plays back the retrieved media content at the vehicle in synchronization with the playback of the media content on the mobile device at step s940, and sends to the mobile device a first message instructing the mobile device to pause its playback of the media content at step s950. Upon receipt of the first message, the mobile device pauses its playback of the media content at step s960.

Figure 10:
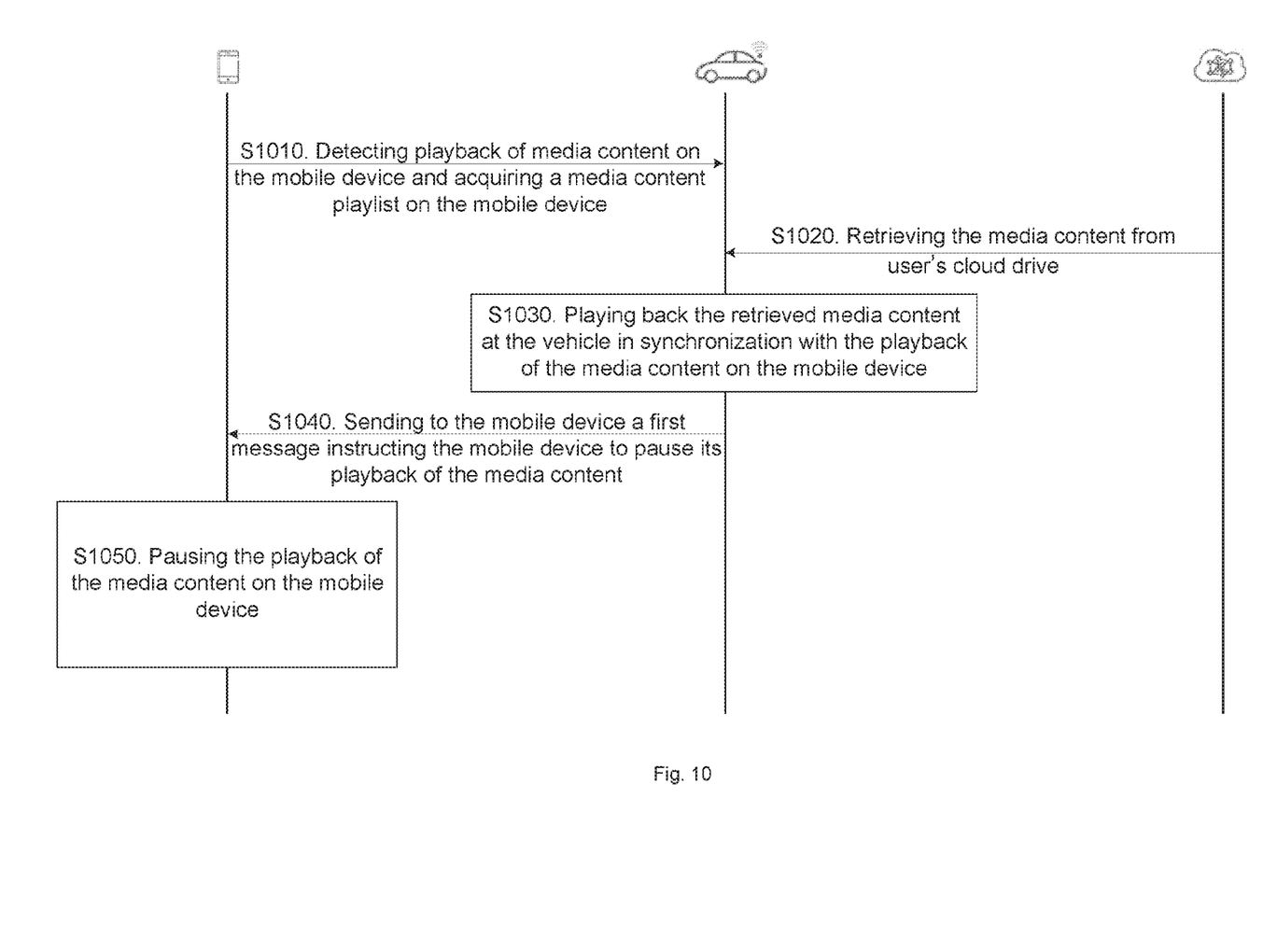
FIG. 10 is a signaling diagram illustrating exemplary operations of and interactions among a mobile device, a vehicle and a cloud service for transferring playback of media content from the mobile device to the vehicle according to another embodiment of the present disclosure.

FIG. 10 depicts exemplary operations of and interactions among a mobile device, a vehicle and a cloud service for transferring playback of media content from the mobile device to the vehicle according to another embodiment of the present disclosure.

As illustrated, at step s1010, the vehicle detects the playback of media content on the mobile device and acquires a media content playlist from the mobile device as shared information between the mobile device and the vehicle. Then, the vehicle retrieves media content listed by the playlist from a content source at step s930. Next, the vehicle plays back the retrieved media content at the vehicle in synchronization with the playback of the media content on the mobile device at step s1030, and sends to the mobile device a first message instructing the mobile device to pause its playback of the media content at step s1040. Upon receipt of the first message, the mobile device pauses its playback of the media content at step s1050.

Figure 11:
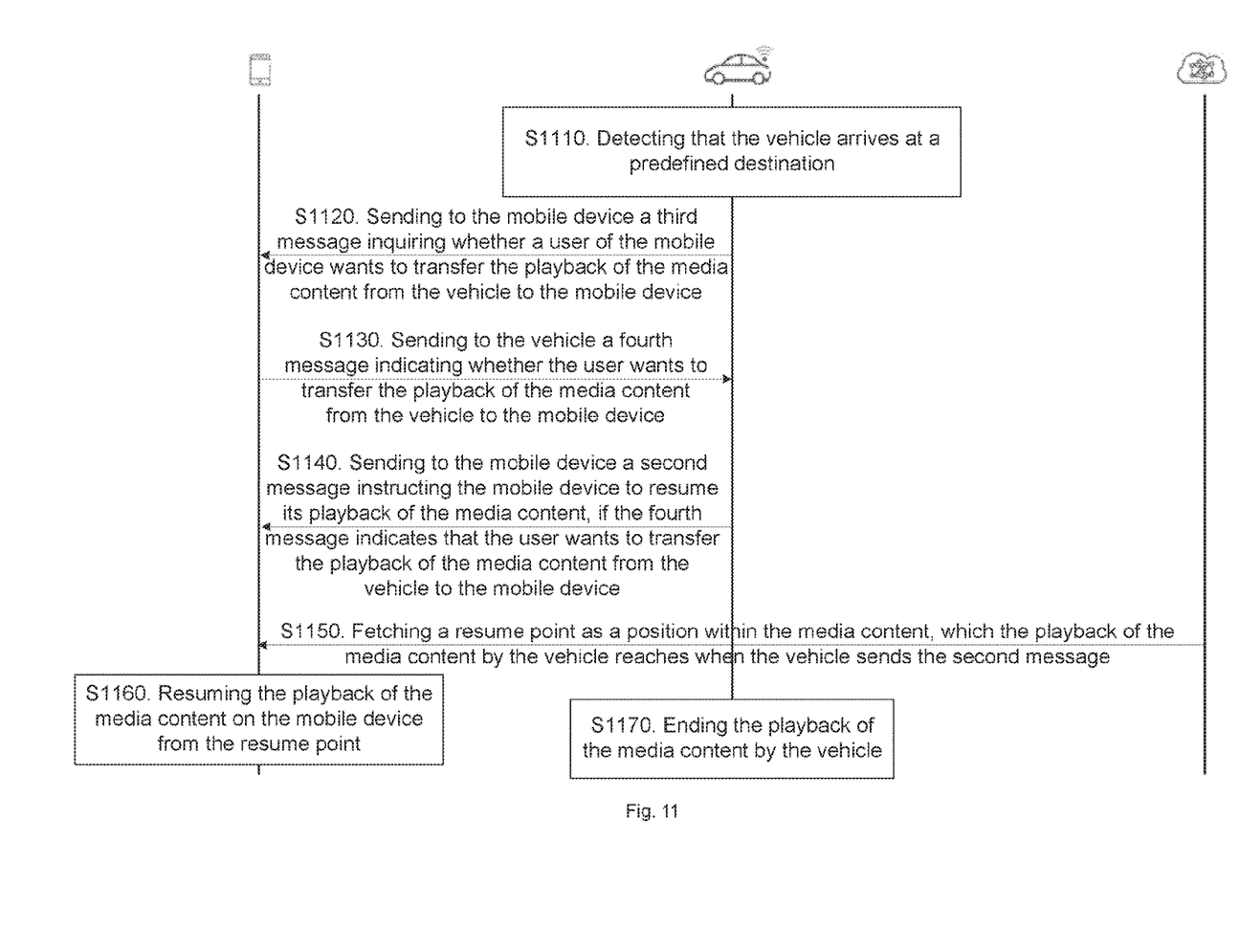
FIG. 11 is a signaling diagram illustrating exemplary operations of and interactions among a mobile device, a vehicle and a cloud service for transferring playback of media content from the vehicle to the mobile device according to a further embodiment of the present disclosure.

FIG. 11 depicts exemplary operations of and interactions among a mobile device, a vehicle and a cloud service for transferring playback of media content from the vehicle to the mobile device according to a further embodiment of the present disclosure.

As illustrated, at step s1110, it is detected that the vehicle arrives at a predefined destination. Then, at step s1120, the vehicle sends to the mobile device a third message inquiring whether a user of the mobile device wants to transfer the playback of the media content from the vehicle to the mobile device. In response to the third message, the mobile device sends to the vehicle a fourth message indicating whether the user wants to transfer the playback of the media content from the vehicle to the mobile device, at step s1130. If the fourth message indicates that the user wants to transfer the playback of the media content from the vehicle to the mobile device, the vehicle sends to the mobile device a second message instructing the mobile device to resume its playback of the media content at step s1140. Upon receipt of the second message, the mobile device fetches from the source of the media content a resume point as a position within the media content, which the playback of the media content by the vehicle reaches when the vehicle sends the second message, at step s1150. Next, the mobile device resumes the playback of the media content on the mobile device from the resume point at step s1160, and the vehicle ends its playback of the media content at step s1170.

In the following, structures of an apparatus 600 for a vehicle for transferring playback of media content between a mobile device and the vehicle and a mobile device 700 for transferring playback of media content between the mobile device and a vehicle will be described with reference to FIGS. 12 and 13, respectively.

Figure 12:
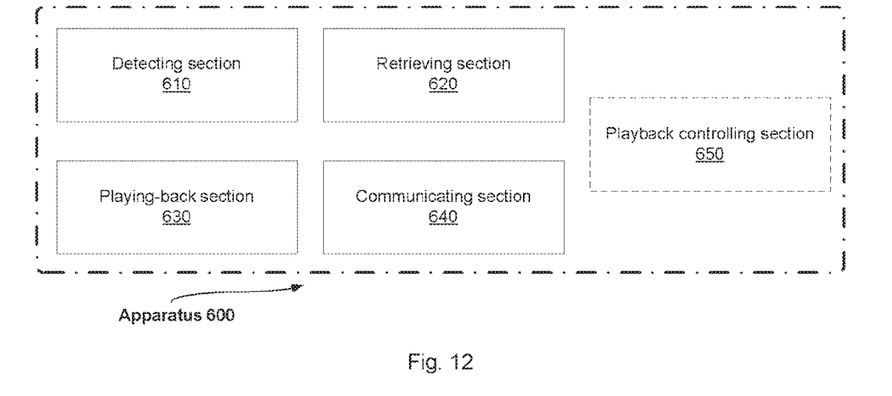
FIG. 12 is a schematic diagram illustrating a structure of an apparatus for a vehicle for transferring playback of media content between a mobile device and the vehicle according to the present disclosure.

As illustrated in FIG. 12, the apparatus 600 comprises a detecting section 610, a retrieving section 620, a playing-back section 630 and a communicating section 640. The detecting section 610 is configured to detect the playback of the media content on the mobile device. The retrieving section 620 is configured to retrieve the media content played back on the mobile device. The playing-back section 630 is configured to play back the retrieved media content at the vehicle in synchronization with the playback of the media content on the mobile device. The communicating section 640 is configured to send to the mobile device a first message instructing the mobile device to pause its playback of the media content.

In an embodiment, the retrieving section 620 may be configured to identify a content source of the media content played back on the mobile device; and retrieve the media content from the identified content source.

In an embodiment, the retrieving section 620 may be configured to acquire a media content playlist on the mobile device which lists media content intended to be played back on the mobile device; and retrieve the media content listed by the media content playlist.

In an embodiment, the communicating section 640 may be further configured to send to the mobile device a second message instructing the mobile device to resume its playback of the media content, if it is detected that the vehicle arrives at a predefined destination. The apparatus 600 may further comprise a playback controlling section 650 configured to end the playback of the media content by the vehicle.

In an embodiment, the communicating section 640 may be further configured to send to the mobile device a third message inquiring whether a user of the mobile device wants to transfer the playback of the media content from the vehicle to the mobile device, if it is detected that the vehicle arrives at a predefined destination; receive from the mobile device a fourth message indicating whether the user wants to transfer the playback of the media content from the vehicle to the mobile device as a response to the third message; and send to the mobile device a second message instructing the mobile device to resume its playback of the media content, if the fourth message indicates that the user wants to transfer the playback of the media content from the vehicle to the mobile device.

Figure 13:
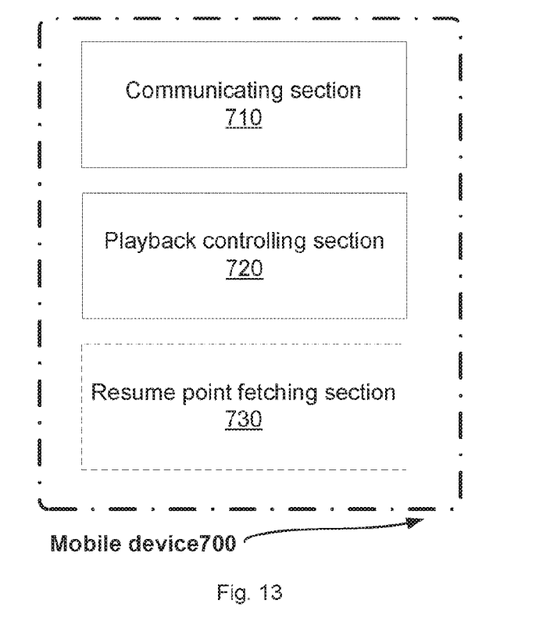
FIG. 13 is a schematic diagram illustrating a structure of a mobile device for transferring playback of media content between the mobile device and a vehicle according to the present disclosure.

Referring to FIG. 13, the mobile device 700 comprises a communication section 710 and a playback controlling section 720. The communicating section 710 is configured to receive from the vehicle a first message instructing the mobile device to pause its playback of the media content. The playback controlling section 720 is configured to pause the playback of the media content on the mobile device.

In an embodiment, the communicating section 710 may be further configured to receive from the vehicle a second message instructing the mobile device to resume its playback of the media content. The mobile device 700 may further comprises a resume point fetching section 730 configured to fetch a resume point as a position within the media content, which the playback of the media content by the vehicle reaches when the vehicle sends the second message. The playback controlling section 720 may be further configured to resume the playback of the media content on the mobile device from the resume point.

In an embodiment, the communicating section 710 may be further configured to receive from the vehicle a third message inquiring whether a user of the mobile device wants to transfer the playback of the media content from the vehicle to the mobile device; and send to the vehicle a fourth message indicating whether the user wants to transfer the playback of the media content from the vehicle to the mobile device as a response to the third message. The second message may be received from the mobile device if the fourth message indicates that the user wants to transfer the playback of the media content from the vehicle to the mobile device.

The present disclosure is described above with reference to the embodiments thereof. However, those embodiments are provided just for illustrative purpose, rather than limiting the present disclosure. The scope of the disclosure is defined by the attached claims as well as equivalents thereof. Those skilled in the art can make various alternations and modifications without departing from the scope of the disclosure, which all fall into the scope of the disclosure.

What is claimed is:

1. A method in a vehicle for transferring playback of media content between a mobile device and the vehicle, comprising:
   identifying the media content being played back on the mobile device;
   retrieving the media content that is identified from a content source other than the mobile device;
   playing back the retrieved media content at the vehicle from a location in the retrieved media content that is time synchronized with a location in the media content that is presently being played by the mobile device;
   sending to the mobile device a first message instructing the mobile device to pause its playback of the media content; and
   continuing the playback of the retrieved media content at the vehicle.

2. The method of claim 1, wherein the retrieving the media content played back by the mobile device comprises:
   identifying the content source of the media content being played back on the mobile device; and
   retrieving the media content from the identified content source.

3. The method of claim 1, further comprising:
   acquiring a media content playlist on the mobile device which lists media content intended to be played back on the mobile device; and
   retrieving the media content listed by the media content playlist from a content source other than the mobile device.

4. The method of claim 1, further comprising:
   sending to the mobile device a second message instructing the mobile device to resume its playback of the media content from a location in the media content corresponding to a location in the retrieved media content at the vehicle that is presently being played by the vehicle, responsive to detecting that the vehicle arrives at a predefined destination; and
   ending the playback of the retrieved media content by the vehicle.

5. The method of claim 1, further comprising:
   sending to the mobile device a third message inquiring whether a user of the mobile device wants to transfer the playback of the media content from the vehicle to the mobile device, responsive to detecting that the vehicle arrives at a predefined destination;
   receiving from the mobile device a fourth message indicating whether the user wants to transfer the playback of the media content from the vehicle to the mobile device as a response to the third message;
   sending to the mobile device a second message instructing the mobile device to resume its playback of the media content from a location in the media content corresponding to a location in the retrieved media content at the vehicle that is presently being played by the vehicle, responsive to the fourth message indicating that the user wants to transfer the playback of the media content from the vehicle to the mobile device; and
   ending the playback of the retrieved media content by the vehicle.

6. A computer program product, embodied on a non-transitory computer-readable medium, comprising computer code including computer-executable instructions that cause a processor to perform the processes of claim 1.

7. A method in a mobile device for transferring playback of media content between the mobile device and a vehicle, comprising:
   playing back the media content on the mobile device;
   receiving from the vehicle a first message instructing the mobile device to pause its playback of the media content;
   pausing the playback of the media content on the mobile device responsive to receiving the first message;
   receiving from the vehicle a second message instructing the mobile device to resume its playback of the media content;
   fetching a resume point as a position within the media content corresponding to a position of which the playback of the media content by the vehicle reaches when the vehicle sends the second message; and
   resuming the playback of the media content on the mobile device from the resume point.

8. The method of claim 7, further comprising:
   receiving from the vehicle a third message inquiring whether a user of the mobile device wants to transfer the playback of the media content from the vehicle to the mobile device; and
   sending to the vehicle a fourth message indicating whether the user wants to transfer the playback of the media content from the vehicle to the mobile device as a response to the third message,
   wherein the second message is received by the mobile device responsive to the fourth message indicating that the user wants to transfer the playback of the media content from the vehicle to the mobile device.

9. An apparatus for a vehicle for transferring playback of media content between a mobile device and the vehicle, comprising:
   a detecting section configured to detect the playback of the media content on the mobile device;
   a retrieving section configured to retrieve the media content played back on the mobile device from a content source other than the mobile device;
   a playing-back section configured to play back the retrieved media content at the vehicle from a location in the retrieved media content that is time synchronized with a location in the media content that is presently being played by the mobile device;
   a communicating section configured to send to the mobile device a first message instructing the mobile device to pause its playback of the media content; and
   the playing-back section is configured to continue the playback of the retrieved media content at the vehicle.

10. The apparatus of claim 9, wherein the retrieving section is configured to:
    identify a content source of the media content being played back on the mobile device; and
    retrieve the media content from the identified content source.

11. The apparatus of claim 9, wherein the retrieving section is further configured to:
    acquire a media content playlist on the mobile device which lists media content intended to be played back on the mobile device; and
    retrieve the media content listed by the media content playlist from a content source other than the mobile device.

12. The apparatus of claim 9, wherein
the communicating section is further configured to send to the mobile device a second message instructing the mobile device to resume its playback of the media content from a location in the media content corresponding to a location in the retrieved media content at the vehicle that is presently being played by the vehicle, responsive to detecting that the vehicle arrives at a predefined destination, and
the apparatus further comprises a playback controlling section configured to end the playback of the retrieved media content by the vehicle.

13. The apparatus of claim 9, wherein
the communicating section is further configured to
send to the mobile device a third message inquiring whether a user of the mobile device wants to transfer the playback of the media content from the vehicle to the mobile device, responsive to detecting that the vehicle arrives at a predefined destination;
receive from the mobile device a fourth message indicating whether the user wants to transfer the playback of the media content from the vehicle to the mobile device as a response to the third message;
send to the mobile device a second message instructing the mobile device to resume its playback of the media content from a location in the media content corresponding to a location in the retrieved media content at the vehicle that is presently being played by the vehicle, responsive to the fourth message indicating that the user wants to transfer the playback of the media content from the vehicle to the mobile device, and
the apparatus further comprises a playback controlling section configured to end the playback of the retrieved media content by the vehicle.

14. A mobile device for transferring playback of media content between the mobile device and a vehicle, comprising:

a playback controlling section configured to play back the media content on the mobile device;

a communicating section configured to receive from the vehicle a first message instructing the mobile device to pause its playback of the media content;

the playback controlling section further configured to pause the playback of the media content on the mobile device responsive to receiving the first message;

the communicating section being further configured to receive from the vehicle a second message instructing the mobile device to resume its playback of the media content, the mobile device further comprising a resume point fetching section configured to fetch a resume point as a position within the media content, which the playback of the media content by the vehicle reaches when the vehicle sends the second message, and the playback controlling being further configured to resume the playback of the media content on the mobile device from the resume point.

15. The mobile device of claim 14, wherein the communicating section is further configured to receive from the vehicle a third message inquiring whether a user of the mobile device wants to transfer the playback of the media content from the vehicle to the mobile device; and send to the vehicle a fourth message indicating whether the user wants to transfer the playback of the media content from the vehicle to the mobile device as a response to the third message, wherein the second message is received by the mobile device responsive to the fourth message indicating that the user wants to transfer the playback of the media content from the vehicle to the mobile device.

\* \* \* \* \*